(12) United States Patent
Muto

(10) Patent No.: US 7,093,862 B2
(45) Date of Patent: *Aug. 22, 2006

(54) TUBE JOINT AND APPARATUS FOR PRODUCING THE SAME

(75) Inventor: Masaaki Muto, Kashiwa (JP)

(73) Assignee: SMC Kabushiki Kaisha, Toyko (JP)

( * ) Notice: Subject to any disclaimer, the term of this patent is extended or adjusted under 35 U.S.C. 154(b) by 39 days.

This patent is subject to a terminal disclaimer.

(21) Appl. No.: 11/030,162

(22) Filed: Jan. 7, 2005

(65) Prior Publication Data

US 2005/0121910 A1 Jun. 9, 2005

Related U.S. Application Data

(63) Continuation of application No. 10/279,098, filed on Oct. 24, 2002, now Pat. No. 6,880,864, which is a continuation of application No. 09/300,447, filed on Apr. 28, 1999, now Pat. No. 6,578,879.

(30) Foreign Application Priority Data

May 13, 1998 (JP) .................................. 10-130136

(51) Int. Cl.
*F16L 21/06* (2006.01)

(52) U.S. Cl. ...................... 285/322; 285/179; 285/323; 285/243; 285/252

(58) Field of Classification Search ................ 285/179, 285/322, 323, 243, 252, 253
See application file for complete search history.

(56) References Cited

U.S. PATENT DOCUMENTS

| | | | |
|---|---|---|---|
| 2,139,745 A | 12/1938 | Goodall | |
| 2,453,997 A | 11/1948 | MacWilliam | |
| 3,017,203 A | 1/1962 | Macleod | |
| 3,378,282 A | 4/1968 | Demler, Sr. | |
| 3,843,169 A | 10/1974 | Wise | |
| 4,018,460 A | 4/1977 | Morris et al. | |
| 4,135,744 A | 1/1979 | Fouts | |
| 4,508,369 A | 4/1985 | Mode | |
| 4,524,501 A | 6/1985 | Pringle | |
| 4,593,943 A | 6/1986 | Hama | |
| 4,955,122 A | 9/1990 | Ootsuki et al. | |
| 5,029,908 A | 7/1991 | Belisaire | |
| 5,044,671 A | 9/1991 | Chisnell et al. | |
| 5,054,821 A | 10/1991 | Hillstead | |
| 5,096,231 A | 3/1992 | Chisnell et al. | |
| 5,139,290 A | 8/1992 | Shafer | |
| 5,160,179 A | 11/1992 | Takagi | |
| 5,220,716 A | 6/1993 | Lostra | |
| 5,230,539 A | 7/1993 | Olson | |
| 5,314,210 A | 5/1994 | Calmettes et al. | |

(Continued)

FOREIGN PATENT DOCUMENTS

CA          1025904          2/1978

(Continued)

*Primary Examiner*—David Bochna
(74) *Attorney, Agent, or Firm*—Oblon, Spivak, McClelland, Maier & Neustadt, P.C.

(57) ABSTRACT

A ring member and ring members made of metal are tightened and installed to the outer circumferential surface of a body made of a resin material. Accordingly, the body is prevented from outward deformation. When a tube joint is used in a high temperature atmosphere, even if any force acts on a fluid tube in the direction to cause detachment from the tube joint due to any external force or the pressure fluid flowing through the inside of the tube joint, then the fluid tube and a connecting member inserted into the body are reliably prevented from disengagement.

11 Claims, 8 Drawing Sheets

U.S. PATENT DOCUMENTS

| | | | |
|---|---|---|---|
| 5,580,100 A | 12/1996 | Umezawa et al. | |
| 5,582,439 A | 12/1996 | Spears | |
| 5,601,317 A | 2/1997 | Crouse | |
| 5,715,723 A | 2/1998 | Owens | |
| 5,722,696 A | 3/1998 | Taneya | |
| 5,722,702 A | 3/1998 | Washburn | |
| 5,845,384 A | 12/1998 | Retzbach | |
| 5,961,157 A | 10/1999 | Baron et al. | |
| 6,010,162 A | 1/2000 | Grau et al. | |
| 6,115,898 A | 9/2000 | Sawdon | |
| 6,415,488 B1 | 7/2002 | Muto | |
| 6,447,019 B1 * | 9/2002 | Hosono et al. | 285/322 |
| 6,578,879 B1 | 6/2003 | Muto | |
| 6,764,102 B1 * | 7/2004 | Ezura | 285/322 |
| 6,869,109 B1 * | 3/2005 | Matsushita | 285/322 |
| 2002/0175518 A1 | 11/2002 | Muto | |
| 2003/0067165 A1 | 4/2003 | Muto | |

FOREIGN PATENT DOCUMENTS

| | | |
|---|---|---|
| CN | 1064534 A | 9/1992 |
| CN | 1169907 A | 1/1998 |
| DE | 39 14 645 | 11/1989 |
| DE | 38 31 611 | 3/1990 |
| EP | 0 370 641 | 5/1990 |
| EP | 0 548 627 | 6/1993 |
| EP | 0 593 838 | 4/1994 |
| FR | 2605709 | 4/1988 |
| GB | 2155576 | 9/1985 |
| JP | 61-4796 | 1/1986 |
| TW | 148237 | 12/1990 |
| TW | 229255 | 9/1994 |
| TW | 236385 | 12/1994 |

* cited by examiner

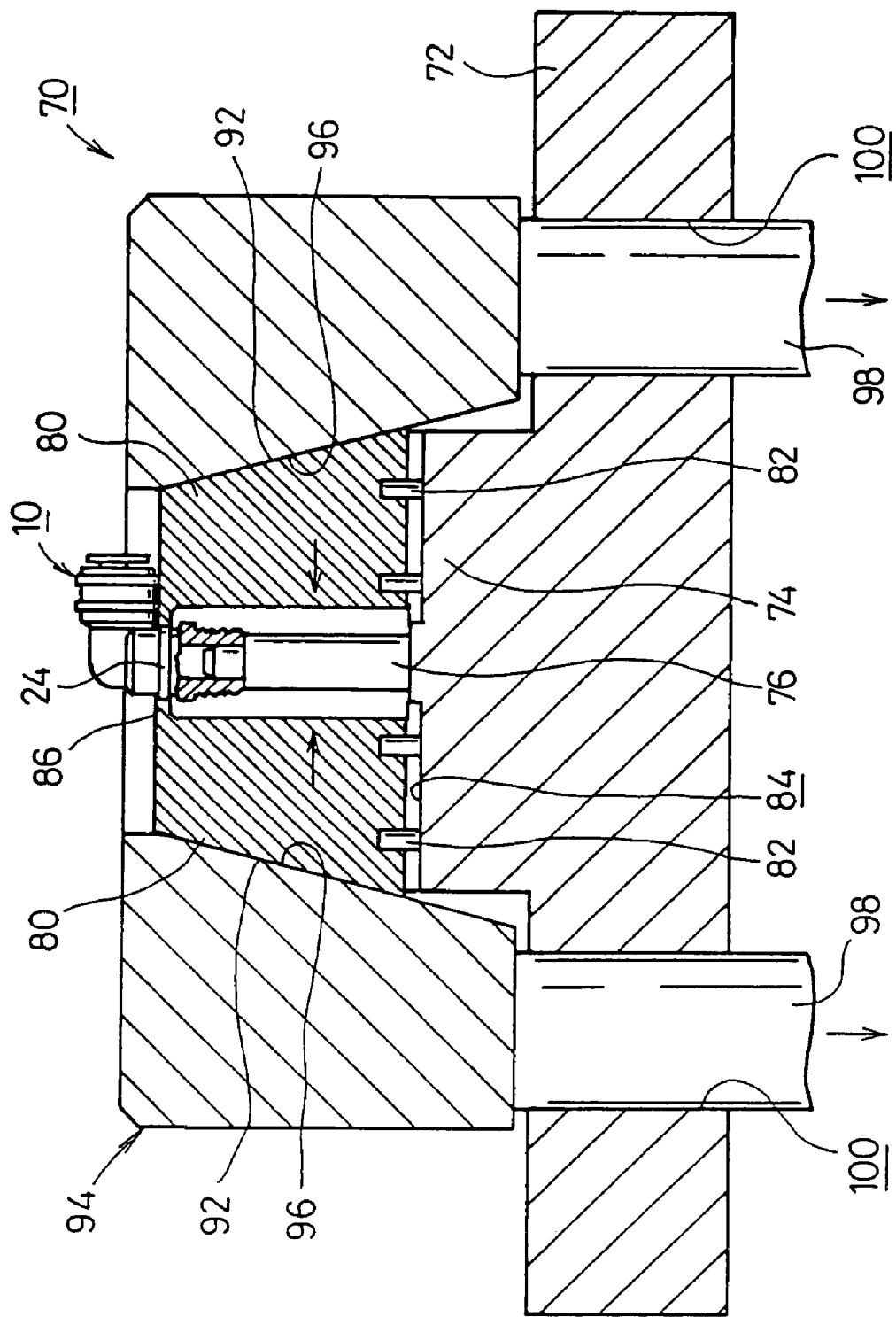

TUBE JOINT AND APPARATUS FOR PRODUCING THE SAME

BACKGROUND OF THE INVENTION

1. Field of the Invention

The present invention relates to a tube joint and a method for producing the same for connecting a fluid tube to a pressure fluid-driven apparatus such as a solenoid-operated valve and a cylinder, the fluid tube being formed with a passage for introducing and discharging a pressure fluid or the like.

2. Description of the Related Art

The tube joint has been hitherto used to connect and couple a fluid tube to a pressure fluid-driven apparatus such as a solenoid-operated valve and a cylinder. Those known as such a tube joint include a tube joint which has a body made of a resin material for inserting a fluid tube thereinto.

However, the tube joint concerning the conventional technique as described above involves the following fear as compared with a tube joint which has a body made of a metal material. That is, when the tube joint is used in a high temperature atmosphere, the body made of the resin material tends to cause deformation outwardly. The fluid tube may be disengaged from the tube joint when any force acts on the fluid tube in the direction to cause detachment from the tube joint due to any external force or the pressure fluid flowing through the inside of the tube joint.

It is also feared that when any external force such as shock is exerted on the body made of the resin material, the body may be detached from a connecting member screwed into the pressure fluid-driven apparatus.

SUMMARY OF THE INVENTION

A general object of the present invention is to provide a tube joint which makes it possible to prevent a fluid tube formed with a passage for allowing a fluid to pass therethrough from disengagement from a body made of a resin material.

A principal object of the present invention is to provide a tube joint which makes it possible to prevent a body made of a resin material from detachment from a connecting member screwed into a pressure fluid-driven apparatus.

Another object of the present invention is to provide an apparatus for producing a tube joint, which makes it possible to conveniently tighten a ring member to be fitted to the outer circumferential surface of a body.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 shows a method for using the tightening apparatus shown in FIG. 4, illustrating a longitudinal sectional view depicting a state in which a tightening member tightens the ring member.

DESCRIPTION OF THE PREFERRED EMBODIMENTS

Figure 1:
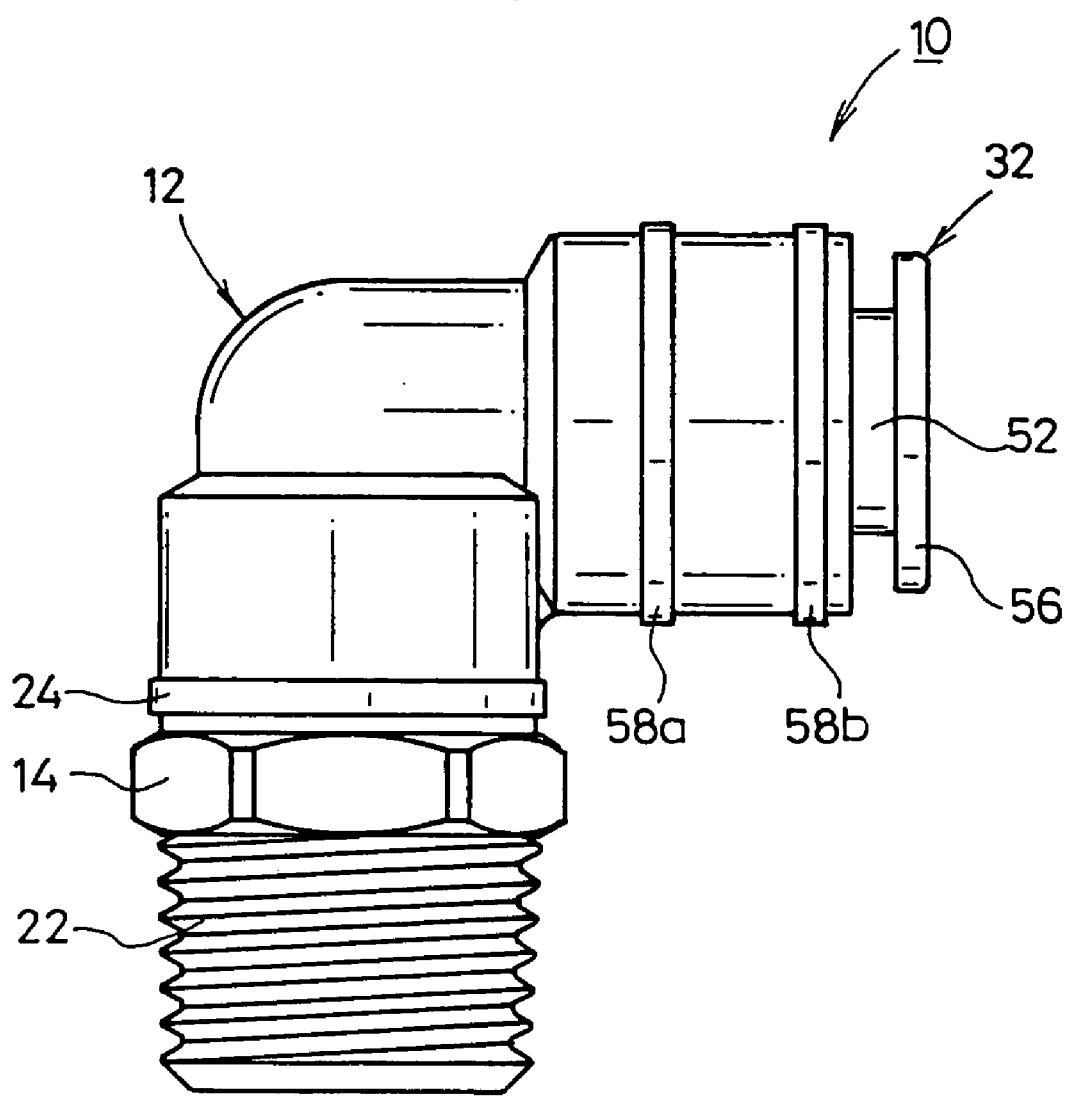
FIG. 1 shows a front view illustrating a tube joint according to an embodiment of the present invention.
Figure 2:
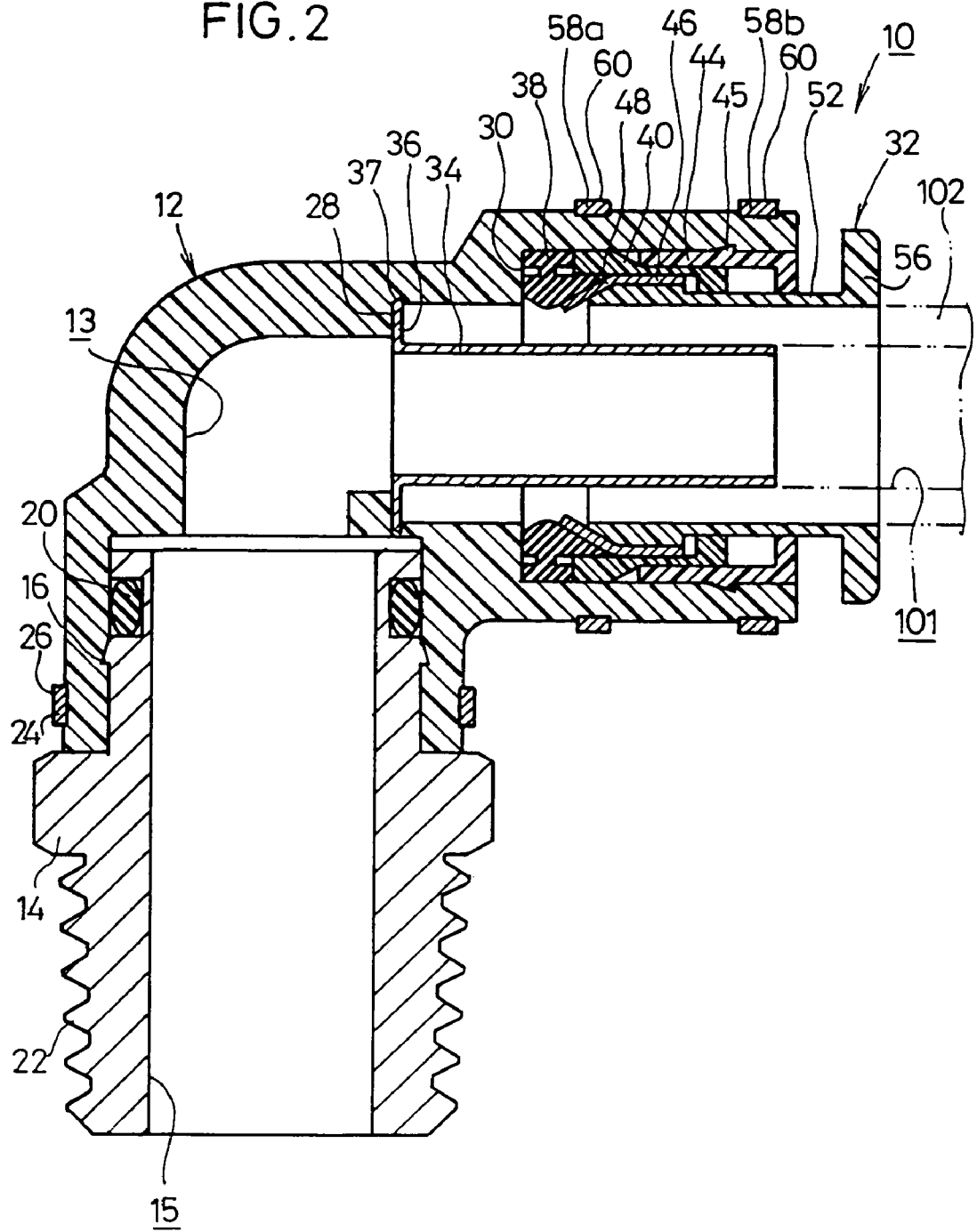
FIG. 2 shows a longitudinal sectional view taken along the axial direction of the tube joint shown in FIG. 1.

With reference to FIGS. 1 and 2, reference numeral 10 indicates a tube joint according to an embodiment of the present invention. The tube joint 10 has a cylindrical body 12 made of a resin material which is formed to have a substantially L-shaped bent configuration. A passage 13 is formed through the body 12. A connecting member 14, which is made of a metal material and which has a passage 15 for allowing a fluid to pass therethrough, is fitted to the first end side of the body 12. An annular expanded section 16, which has a sharp cross section, is formed on the outer circumference of the connecting member 14. The annular expanded section 16 bites into the inner wall surface of the body 12, and thus the connecting member 14 is prevented from disengagement from the body 12.

An O-ring 20 is installed in an annular groove disposed at a portion of connection between the body 12 and the connecting member 14. Thus, the pressure fluid, which passes through the inside of the body 12, is prevented from leakage. A male thread 22 is formed on the outer circumference on the end side of the connecting member 14. The tube joint 10 is connected, for example, to a cylinder or a solenoid-operated valve by screwing the male thread 22 into an unillustrated port of the cylinder, the solenoid-operated valve or the like.

A ring member 24 for tightening the connection site between the body 12 and the connecting member 14 is fitted to the outer circumference of the body 12. The ring member 24 is made of a metal material, and it is fitted to the outer circumferential surface of the body 12 by being tightened at its outer circumferential section 26.

Figure 3:
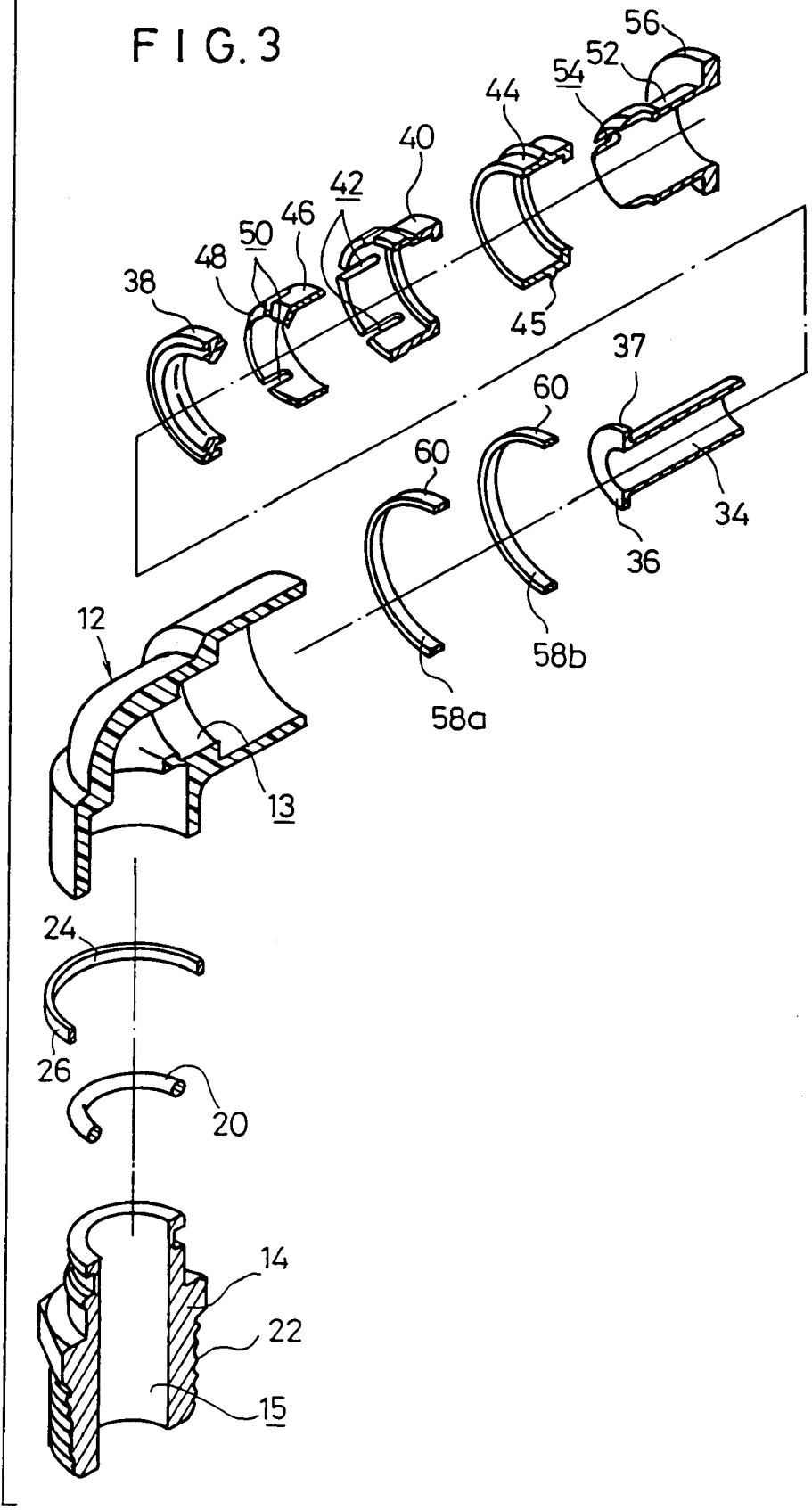
FIG. 3 shows an exploded perspective view illustrating the tube joint shown in FIG. 1.

A first step section 28 and a second step section 30 are formed on the inner wall on the second end side of the body 12. A flange 36 of a sleeve 34 for constructing an attachment/detachment mechanism 32 is engaged with the first step section 28. An inclined section 37 for being fastened to the inner wall surface of the body 12 is formed on the outer circumference of the flange 36. A packing (seal member) 38 is installed to the second step section 30. The packing 38 abuts against a first end of a collet 40. As shown in FIG. 3, the collet 40 has a plurality of slits 42 formed on its first end side.

A cylindrical guide member 44 is inserted between the outer wall at the second end of the collet 40 and the inner wall of the body 12. A circumscribing expanded section 45 having a sharp cross section is formed on the outer circumference of the guide member 44. The expanded section 45 bites into the inner wall surface of the body 12, and thus the guide member 44 is prevented from disengagement from the body 12. A chuck 46, which is made of an elastic metal material to have a substantially cylindrical configuration, is inserted into the collet 40. A fastening section 48, which bites into the outer circumferential surface of a fluid tube as described later on to fasten the fluid tube, is formed at a first end of the chuck 46. The chuck 46 has a plurality of slits 50 which are formed on its first end side. Accordingly, the fastening section 48 of the chuck 46 is constructed such that it is elastically deformable in the radial direction.

A release bush 52 is inserted into the chuck 46. The release bush 52 has a plurality of slits 54 formed at its first end, and its diameter is gradually reduced to make engagement with the fastening section 48 of the chuck 46. A flange 56, which protrudes radially outwardly, is formed at the second end of the release bush 52.

A pair of ring members 58a, 58b, which are separated from each other by a predetermined spacing distance, are fitted to the outer circumferential surface of the body 12 provided with the attachment/detachment mechanism 32. Each of the ring members 58a, 58b is made of a metal material, and it is fitted to the body 12 by being tightened at its outer circumference 60.

The number of the ring members 58a, 58b is not limited to two, which may be one or three or more.

The tube joint 10 according to the embodiment of the present invention is basically constructed as described above. Next, a tightening apparatus 70 for tightening the ring member 24 will be explained below on the basis of FIGS. 4 and 5.

Figure 4:
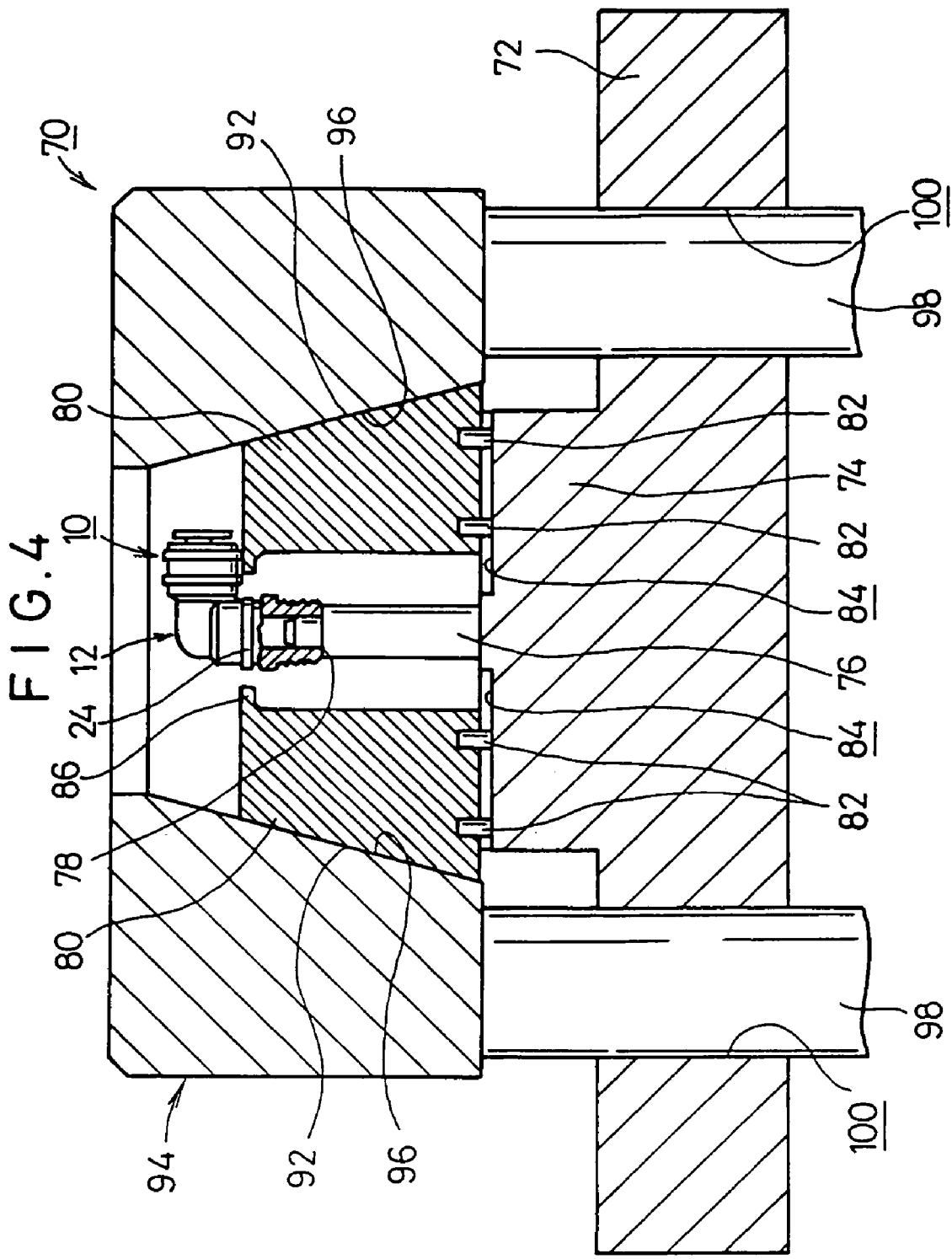
FIG. 4 shows a longitudinal sectional view illustrating a tightening apparatus for tightening a ring member to be installed to the tube joint shown in FIG. 1.
Figure 5:
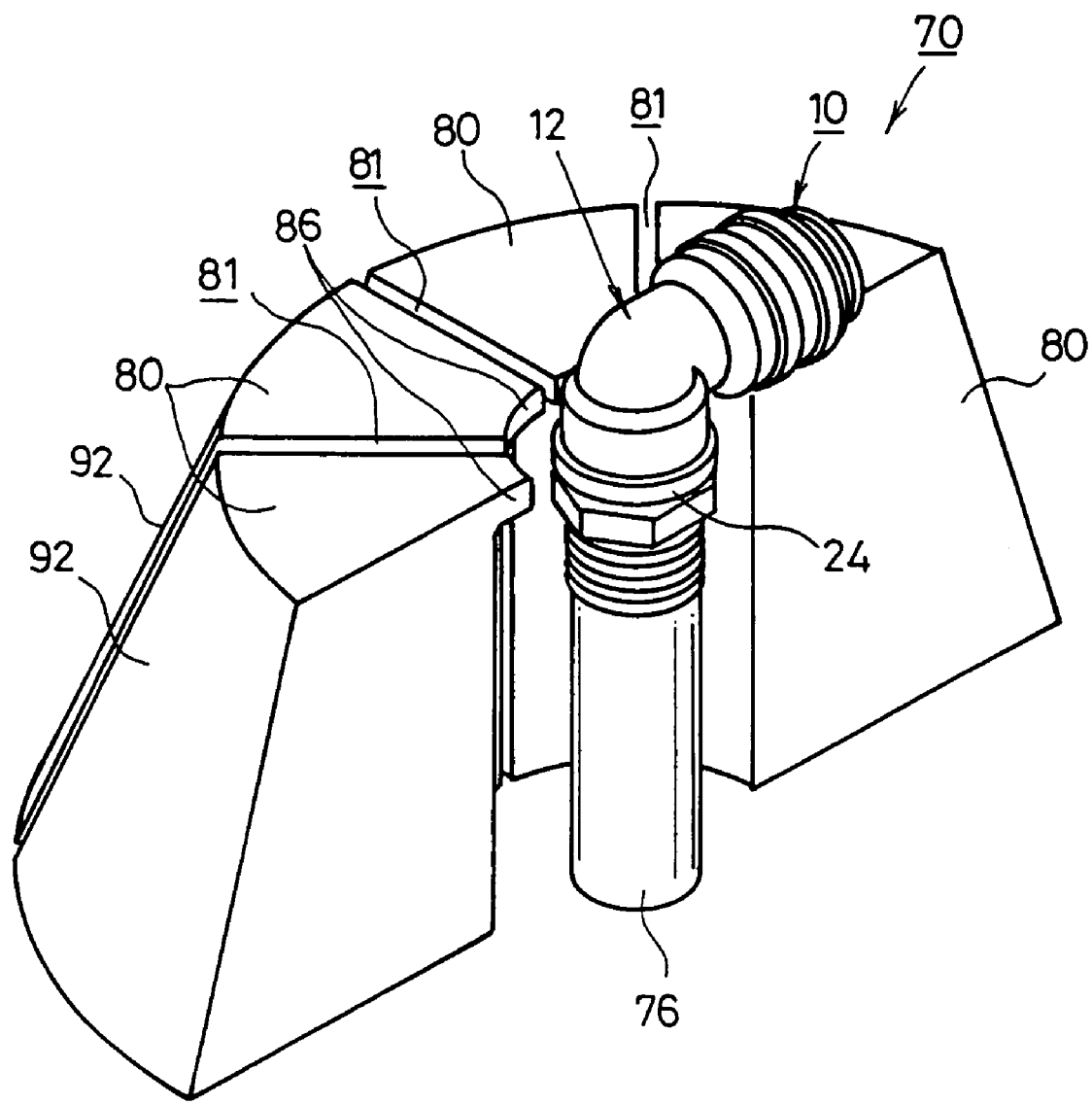
FIG. 5 shows, with partial omission, a perspective view illustrating the tightening apparatus shown in FIG. 4.

As shown in FIG. 4, the tightening apparatus 70 is provided with a base pedestal 72. A circular base stand 74 is formed at a central portion of the base pedestal 72. A columnar member 76 is secured to a central portion of the base stand 74. A step section 78 for engaging with the inner wall of the connecting member 14 is formed in the vicinity of the end of the columnar member 76. As shown in FIG. 5, a plurality of tightening members 80 are arranged on the base stand 74 so that the columnar member 76 is surrounded thereby. The tightening members 80 are provided such that they are slidable in the radial direction of the base stand 74.

As shown in FIG. 5, the adjoining tightening members 80, 80 are arranged such that they are separated from each other by a gap 81 before performing the tightening operation. Pin members 82 are secured to lower portions of the tightening members 80. The pin members 82 are engaged with grooves 84 formed on the base stand 74 so that the tightening members 80 are prevented from rotation.

Figure 6:
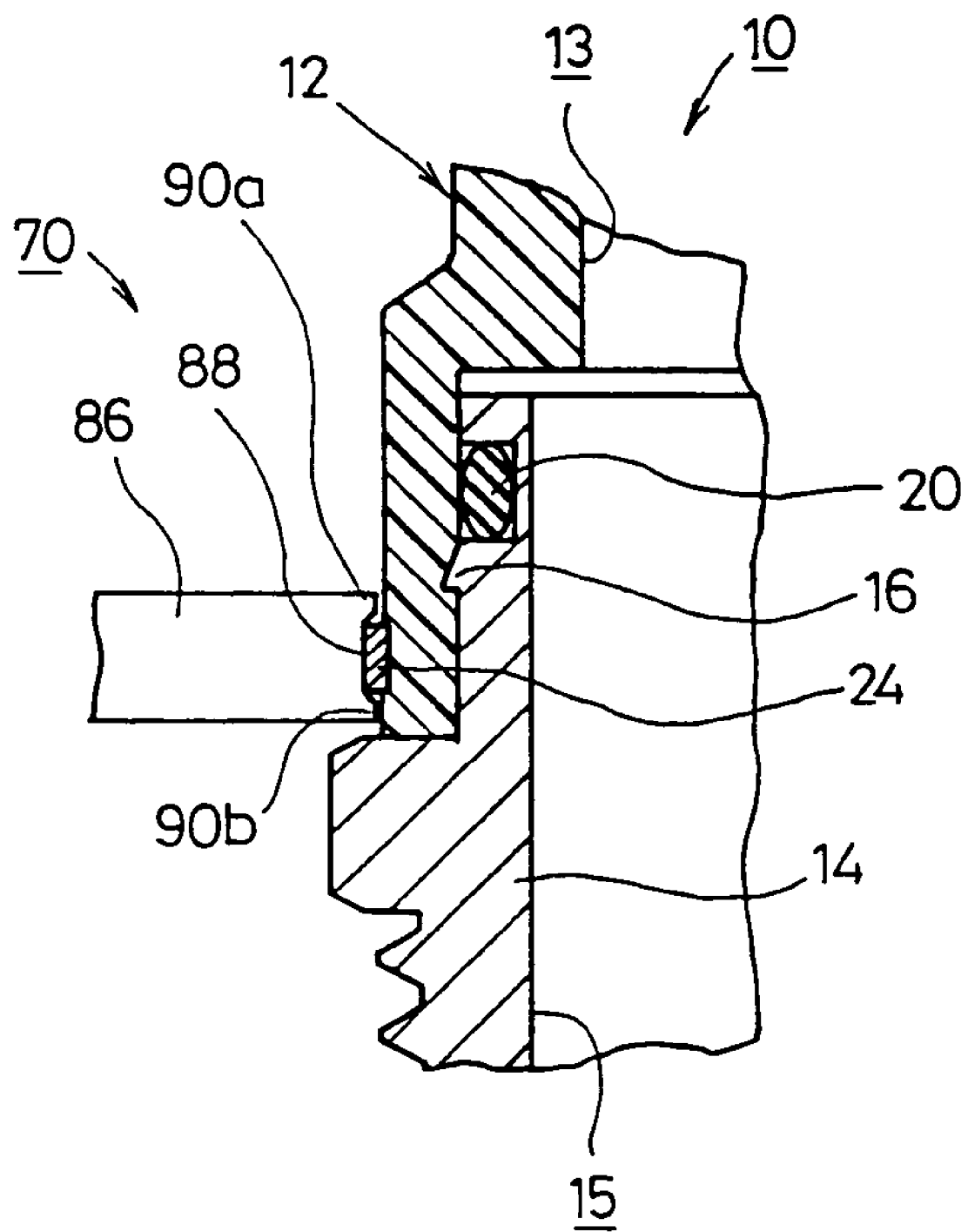
FIG. 6 shows a partial magnified longitudinal sectional view illustrating the tightening apparatus shown in FIG. 4 and a connecting member.

A circular arc-shaped projection 86, which protrudes toward the tube joint 10, is formed at an upper portion of each of the tightening members 80. As shown in FIG. 6, a tightening section 88, which is composed of an annular recess for engaging with the ring member 24, is formed on the circular arc-shaped projection 86. Holding sections 90a, 90b, which protrude forward toward the tube joint 10, are formed over and under the tightening section 88. The tightening sections 88 are formed such that they substantially coincide with the outer circumferential shape of the ring member 24 which is tightened when the plurality of tightening members 80 having been divided in the circular arc-shaped configuration in the circumferential direction are displaced toward the tube joint 10 so that the adjoining tightening members 80 abut against each other. A conical surface 92 is formed by the surfaces of the tightening members 80 disposed on the side opposite to the columnar member 76.

As shown in FIG. 4, a pressing member 94, which has a substantially ring-shaped configuration to surround the tightening members 80, is provided on the base pedestal 72. The pressing member 94 has its inner wall surface 96 which is formed such that its diameter is gradually increased in the downward direction corresponding to the conical surface 92 of the tightening members 80. A plurality of guide shafts 98 are provided at lower portions of the pressing member 94. The guide shafts 98 are provided such that they are insertable through guide holes 100 formed through the base pedestal 72. An unillustrated driving source such as a cylinder is connected to lower portions of the guide shafts 98. When the driving source is operated, the pressing member 94 is displaced upwardly and downwardly.

Next, explanation will be made for a tightening apparatus 110 for tightening the ring members 58a, 58b of the tube joint 10. The same constitutive elements as those of the tightening apparatus 70 described above are designated by the same reference numerals, detailed explanation of which will be omitted.

Figure 7:
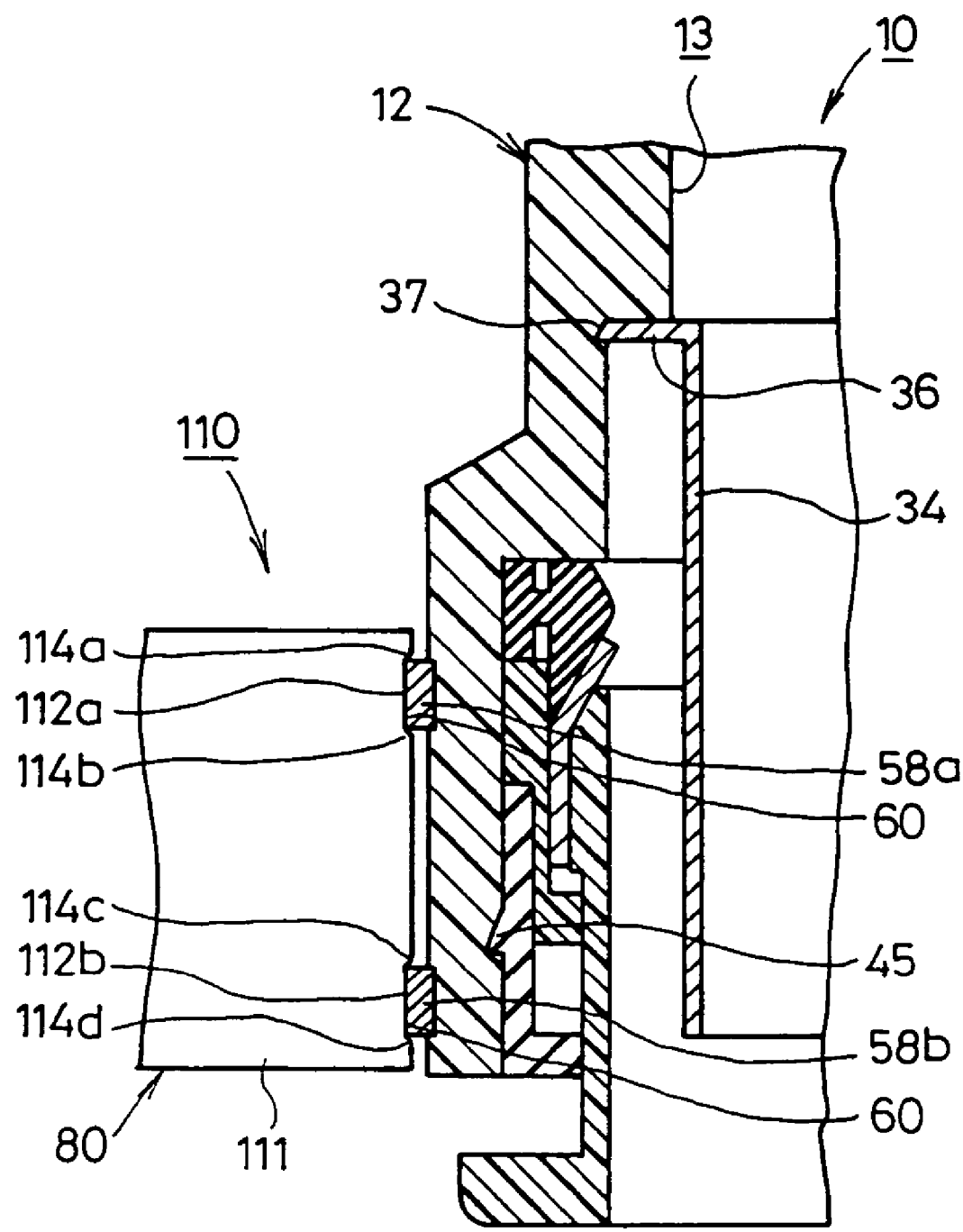
FIG. 7 shows a partial magnified longitudinal sectional view illustrating the tightening apparatus shown in FIG. 4 and an attachment/detachment mechanism.

As shown in FIG. 7, a circular arc-shaped projections 111, which is formed with each of the tightening members 80 of the tightening apparatus 110, is provided with two tightening sections 112a, 112b corresponding to the ring members 58a, 58b of the tube joint 10, the two tightening sections 112a, 112b being composed of a pair of annular recesses formed to be substantially parallel to one another. Holding sections 114a to 114d, which protrude forward toward the tube joint 10, are formed over and under the tightening sections 112a, 112b.

The tightening apparatuses 70, 110 are constructed as described above. Next, their operations will be explained below.

The connecting member 14, the sleeve 34, the packing 38, the collet 40, the guide member 44, the chuck 46, and the release bush 52 are installed beforehand to the body 12 of the tube joint 10.

After completion of the preparatory stage as described above, the ring member 24 and the ring members 58a, 58b are fitted to the body 12. At this stage, the ring member 24 and the ring members 58a, 58b are not tightened.

Subsequently, as shown in FIG. 4, the inner wall of the connecting member 14 of the tube joint 10 is engaged with the step section 78 formed on the columnar member 76 of the. tightening apparatus 70 so that the tube joint 10 is positioned on the tightening apparatus 70.

Subsequently, the pressing member 94 is displaced downwardly in accordance with the operating action of the unillustrated cylinder. As a result, as shown in FIG. 8, the conical surface 92 of the tightening members 80 is pressed by the inner wall surface 96 of the pressing member 94, and the plurality of divided tightening members 80 are displaced toward the tube joint 10. During this process, the gaps 81 between the adjoining tightening members 80, 80 are gradually decreased, and thus the tightening sections 88 are engaged with the outer circumference 26 of the ring member 24. In other words, the plurality of tightening members 80, which are divided to give the circular arc-shaped configuration, are displaced toward the center respectively in accordance with the sliding action of the conical surface 92 of the tightening members 80 and the inner wall surface 96 of the pressing member 94.

Therefore, the gaps 81 disappear in accordance with the displacement action of the tightening members 80, and thus the adjoining tightening members 80, 80 abut against each other. As a result, the divided tightening sections 88 make abutment to give a substantially circular configuration, and the tightening sections 88 press the outer circumference 26 of the ring member 24 over its entire circumference substantially uniformly toward the center. Accordingly, the ring member 24 is tightened, and it is deformed so that its diameter is decreased. Thus, the ring member 24 is fitted to the outer circumferential surface of the body 12 so that it bites into the body 12.

During this process, the ring member 24 undergoes deformation to make expansion in the vertical direction. However, the upper and lower portions of the ring member 24 are held by the holding sections 90a, 90b of the tightening members 80. Accordingly, the deformation is regulated (see FIG. 6). Therefore, it is not feared that the ring member 24 is extruded from the tightening sections 88. Further, the ring member 24 is not deformed radially outwardly.

When the tightening operation for the ring member 24 is completed, the ring members 58a, 58b are subsequently tightened. In this case, the attachment/detachment mechanism 32 of the tube joint 10 is installed to the columnar member 76 of the tightening apparatus 110. When the pressing member 94 is displaced downwardly, the plurality of tightening members 80 are displaced in the direction to make approach to the tube joint 10. Accordingly, the tightening sections 112a, 112b press the outer circumferences 60 of the ring members 58a, 58b substantially uniformly over the entire circumferences. Therefore, the ring members 58a, 58b are tightened, and they are fitted so that they bite into the outer circumferential surface of the body 12 (see FIG. 7).

As described above, the ring members 24, 58a, 58b can be conveniently tightened with respect to the outer circumferential surface of the body 12 made of resin by using the tightening apparatuses 70, 110 having the simple structures. As a result, it is possible to suppress the production cost for producing the tube joint.

The tube joint 10, for which the ring member 24 and the ring members 58a, 58b have been tightened as described above, is installed, for example, to a cylinder or a solenoid-operated valve. In this case, the male thread 22 of the connecting member 14 is screwed into a port of the cylinder, the solenoid-operated valve or the like.

A fluid tube 102, which is formed with a passage 101 for allowing the fluid to pass therethrough, is coupled to the attachment/detachment mechanism 32. The fluid tube 102 is inserted between the sleeve 34 and the release bush 52, and the first end of the fluid tube 102 is allowed to make abutment against the flange 36. In this state, when the fluid tube 102 is slightly pulled through the tube joint 10, the fastening section 48 of the chuck 46 bites into the outer circumferential surface of the fluid tube 102. If it is intended to disengage the fluid tube 102 from the tube joint 10 in this state, the fastening section 48 further bites into the outer circumferential surface of the fluid tube 102. Therefore, the fluid tube 102 is reliably prevented from disengagement. On the other hand, when the flange 56 of the release bush 52 is pushed inwardly into the tube joint 10, the forward end of the release bush 52 presses the fastening section 48 of the chuck 46 radially outwardly to increase the diameter. Thus, it is possible to release the engaged state in which the fastening section 48 bites into the outer circumferential surface of the fluid tube 102. Accordingly, the fluid tube 102 can be easily disengaged.

For example, even when the tube joint 10 is used in a high temperature atmosphere, or even when a relatively high pressure is applied to the inside of the tube joint 10 by the pressure fluid, then the body 12 is prevented from any deformation in the outward direction, because the body 12 is tightened with the ring member 24 and the ring members 58a, 58b. Therefore, it is possible to eliminate any fear of disengagement of the connecting member 14 and the fluid tube 102 from the body 12. Even when any external force such as shock is exerted on the body 12, there is no fear of disengagement of the connecting member 14 from the body 12.

The connection site between the body 12 and the fluid tube 102 and the connection site between the body 12 and the connecting member 14 are tightened by the ring members 24, 58a, 58b. Therefore, the connection sites can be held more tightly in an air-tight or liquid-tight manner.

In the embodiment of the present invention, the connecting member 14 is installed to the body 12 of the tube joint 10. However, it is also allowable that a thread section (not shown) is directly formed integrally with the body 12 without installing the connecting member 14, and the thread section is screwed into an unillustrated port of a cylinder or the like.

Further, in the embodiment of the present invention, the ring members 24, 58a, 58b are fitted around the outer circumferential surface of the body 12 by being tightened at their outer circumferences, however, it is also allowable that the ring members 24, 58a, 58b are fitted around the outer circumferential surface of the body 12 by being press-fitted.

What is claimed as new and desired to secured by Letters Patent of the United States is:

1. A tube joint comprising:
    a body made of a resin material having a distal edge and an opening at a second end of said body;
    an attachment/detachment mechanism into which a tube is configured to be inserted and which comprises:
        a fastening section configured to bite an outer circumferential surface of the tube;
        a collet having a taper section provided outside said fastening section; and
        an engaging member provided outside said taper section, said engaging member having a projection which outwardly projects from an outer circumferential surface of said engaging member and which engages with an inner circumferential wall surface of said body at said second end: and
        a seal member for surrounding an outer circumferential surface of the tube to prevent a pressure fluid from leakage; and
    a ring member fitted to an outer circumferential wall surface of said body at said second end, and
    wherein when a force is applied to the inserted tube to pull out the tube from the attachment/detachment mechanism, said attachment/detachment mechanism is constructed such that said fastening section is displaced together with said collet along an inner circumferential surface of said engaging member in a direction opposite to an inserting direction of the tube and that said engaging member engages with said taper section of said collet to press said fastening section radially inwardly toward the outer circumferential surface of the tube, and
    where when the force is applied to the inserted tube to pull out the tube from the attachment/detachment mechanism, said seal member is displaced together with the tube in the direction opposite to the inserting direction of the tube, and said seal member abuts against said fastening section and said collet for preventing the tube being disengaged from said attachment/detachment mechanism.

2. The tube joint according to claim 1, wherein said ring member presses the outer circumferential wall surface of said body radially inwardly.

3. The tube joint according to claim 1, wherein a connecting member, which is made of a metal material and which is adapted to be screwed into a port of a pressure fluid driven apparatus, is coupled to a first end of said body, and another ring member made of metal which has its outer circumference pressed radially inwardly so that said body and said connecting member are prevented from disengagement, is fitted to said outer circumferential wall surface of said body coupled to said connecting member; and wherein said connecting member has at least one annular expanded section for preventing the disengagement of said connecting member from said body.

4. The tube joint according to claim 1, wherein said attachment/detachment mechanism further includes a release bush inserted into a chuck to release a fastened state of said fastening section with respect to said tube.

5. The tube joint according to claim 1, further comprising:
an additional ring member fitted to the outer circumferential wall surface of said second end of said body and pressing the outer circumferential wall surface of said body radially inwardly for preventing said body from being deformed, said additional ring member being positioned such that the projection of said engaging member is located between the ring member and the additional ring member.

6. The tube joint according to claim 1, wherein said second end does not have any slits.

7. A tube joint comprising:
a body made of a resin material having a distal edge and an opening at a second end of said body;
an attachment/detachment mechanism into which a tube is configured to be inserted and which comprises:
a fastening section configured to bite an outer circumferential surface of the tube;
a collet having a taper section provided outside said fastening section;
an engaging member provided outside said taper section, said engaging member having a projection which outwardly projects from an outer circumferential surface of said engaging member and which engages with an inner circumferential wall surface of said body at said second end: and
a seal member for surrounding an outer circumferential surface of the tube to prevent a pressure fluid from leakage; and
a ring member fitted to an outer circumferential wall surface of said body at said second end and pressing the outer circumferential wall surface of said body radially inwardly,
wherein when a force is applied to the inserted tube to pull out the tube from the attachment/detachment mechanism, said attachment/detachment mechanism is constructed such that said fastening section is displaced together with said collet along an inner circumferential surface of said engaging member in a direction opposite to an inserting direction of the tube and said engaging member engages with said taper section of said collet to press said fastening section radially inwardly toward the outer circumferential surface of the tube, wherein when the force is applied to the inserted tube to pull out the tube from the attachment/detachment mechanism, said seal member is displaced together with the tube in the opposite direction to the inserting direction of the tube, and said seal member abuts against said fastening section and said collet for preventing the tube being disengaged from said attachment/detachment mechanism, and wherein said ring member presses the outer circumferential wall surface of said body radially inwardly, and said taper section of said collet engages with an end surface of said engaging member to press said fastening section for preventing said engaging member from being disengaged from said body.

8. The tube joint according to claim 7, wherein a connecting member, which is made of a metal material and which is adapted to be screwed into a port of a pressure fluid driven apparatus, is coupled to a first end of said body, and another ring member made of metal which has its outer circumference pressed radially inwardly so that said body and said connecting member are prevented from disengagement, is fitted to said outer circumferential wall surface of said body coupled to said connecting member; and wherein said connecting member has at least one annular expanded section for preventing the disengagement of said connecting member from said body.

9. The tube joint according to claim 7, wherein said attachment/detachment mechanism further includes a release bush inserted into a chuck to release a fastened state of said fastening section with respect to said tube.

10. The tube joint according to claim 7, further comprising:
an additional ring member fitted to the outer circumferential wall surface of said second end of said body and pressing the outer circumferential wall surface of said body radially inwardly for preventing said body from being deformed, said additional ring member being positioned such that the projection of said engaging member is located between the ring member and the additional ring member.

11. The tube joint according to claim 7, wherein said second end does not have any slits.

* * * * *